US009455986B2

(12) United States Patent  
Marais et al.

(10) Patent No.: US 9,455,986 B2  
(45) Date of Patent: Sep. 27, 2016

(54) METHOD OF AUTHENTICATING A DEVICE TO ACCESS A SERVICE

(71) Applicant: Orange, Paris (FR)

(72) Inventors: Charles Marais, Lannion (FR); Gael Gourmelen, Louannec (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/411,784

(22) PCT Filed: Jun. 21, 2013

(86) PCT No.: PCT/FR2013/051457  
§ 371 (c)(1),  
(2) Date: Dec. 29, 2014

(87) PCT Pub. No.: WO2014/001695  
PCT Pub. Date: Jan. 3, 2014

(65) Prior Publication Data  
US 2015/0150103 A1  May 28, 2015

(30) Foreign Application Priority Data

Jun. 28, 2012 (FR) ...................................... 12 56160

(51) Int. Cl.
| | |
|---|---|
| *H04L 29/00* | (2006.01) |
| *H04L 29/06* | (2006.01) |
| *G06F 21/34* | (2013.01) |
| *G06F 21/35* | (2013.01) |
| *G06F 21/41* | (2013.01) |
| *G06F 21/30* | (2013.01) |

(52) U.S. Cl.  
CPC ........... *H04L 63/0869* (2013.01); *G06F 21/34* (2013.01); *G06F 21/35* (2013.01); *G06F 21/41* (2013.01); *H04L 63/0853* (2013.01); *H04L 63/0876* (2013.01); *G06F 21/30* (2013.01)

(58) Field of Classification Search  
CPC ......... H04L 9/32; H04L 63/08; G06F 21/03; G06F 21/04  
USPC ......... 713/168–173, 182–186; 726/1–10, 21, 726/26–30  
See application file for complete search history.

(56) References Cited

U.S. PATENT DOCUMENTS

| 8,990,406 B2* | 3/2015 | Doss ....................... H04L 63/10 |
| | | 709/203 |
| 2004/0111373 A1* | 6/2004 | Iga .......................... G06F 21/10 |
| | | 705/51 |

(Continued)

FOREIGN PATENT DOCUMENTS

| EP | 2456164 A2 | 5/2012 |
| WO | 2006101561 A2 | 9/2006 |

(Continued)

OTHER PUBLICATIONS

International Search Report and Written Opinion dated Oct. 23, 2013 for corresponding International Application No. PCT/FR2013/051457, filed Jun. 21, 2013.

(Continued)

*Primary Examiner* — Madhuri Herzog  
(74) *Attorney, Agent, or Firm* — David D. Brush; Westman Champlin & Koehler, P.A.

(57) ABSTRACT

The invention relates to a method of authenticating a user of a first device while accessing a service offered by a service provider, the first device forming part of a group of devices in a local network that includes a second device of a user having an identification module for identifying and authenticating the user with the service, the method being characterized in that it comprises a prior broadcast step during which the second device broadcasts to the first device its ability to supply proof of an authentication, and in that, when the first device seeks to authenticate itself, the method further comprising:
- a request step (ET14, ET22) requesting the second device for proof of successful authentication with the service, the proof including the identity of the user of the second device;
- a transmission step (ET16, ET23) of the second device transmitting the proof to the first device; and
- an authentication step (ET18, ET25) of authenticating the user of the first device on the basis of the received proof.

5 Claims, 2 Drawing Sheets

(56) References Cited

U.S. PATENT DOCUMENTS

| | | |
|---|---|---|
| 2008/0098466 A1 | 4/2008 | Yoshida et al. |
| 2009/0178112 A1 | 7/2009 | Doman et al. |
| 2009/0205035 A1* | 8/2009 | Sermersheim .......... H04L 63/10 726/9 |
| 2009/0307744 A1* | 12/2009 | Nanda ................... G06F 21/335 726/1 |
| 2012/0131343 A1* | 5/2012 | Choi ................... H04L 63/0815 713/168 |

FOREIGN PATENT DOCUMENTS

| | | |
|---|---|---|
| WO | 2009139890 A1 | 11/2009 |
| WO | 2010094330 A1 | 8/2010 |

OTHER PUBLICATIONS

English translation of the Written Opinion of the International Searching Authority dated Dec. 28, 2014 for corresponding International Application No. PCT/FR2013/051457, filed Jun. 21, 2013.

* cited by examiner

METHOD OF AUTHENTICATING A DEVICE TO ACCESS A SERVICE

CROSS-REFERENCE TO RELATED APPLICATIONS

This Application is a Section 371 National Stage Application of International Application No. PCT/FR2013/051457, filed Jun. 21, 2013, which is incorporated by reference in its entirety and published as WO 2014/001695 A1 on Jan. 3, 2014, not in English.

TECHNICAL FIELD

The invention relates to a method of authenticating a user of a device belonging to a group of devices with respect to a service that is supplied by a service provider.

The invention finds a particularly advantageous application in the field of systems with unique authentication to enable a user having a plurality of devices to be authenticated a limited number of times.

STATE OF THE ART

A client's access to a service as made available by a service provider is generally preceded by a prior step of registering the user with the service. This prior step is followed by a step of issuing secret information, such as a user name (or identifier) and a password, which information is shared between the client and the service. Thereafter, when accessing the service, when the client is a user, the client inputs personal data on a device, e.g. via a graphics interface; after being input, the personal data is transmitted to the provider, which verifies it and authorizes access when the data corresponds to the secret information supplied during the issuing step. Once authorized, the user can access the service. Conversely, the provider refuses access when the data does not correspond to any registered data.

Nowadays, a given user (or group of users) may possess a plurality of devices, in particular in a home network. It is now common to find a plurality of devices connected to a single home network. The devices in question may for example be television sets, computers (laptops or desktops), smartphones, . . . .

In the network, access to a service from two different devices requires two distinct authentications. For example, this may require an identifier and a password to be input on each device, and that is not always desirable since the users of two devices desiring access to a service may both belong to a common group of users, or may indeed be the same user.

INVENTION

The invention seeks to improve the situation. To this end, in a functional aspect, the invention provides a method of authenticating a user of a first device while accessing a service offered by a service provider, the first device forming part of a group of devices in a local network that includes a second device of a user having an identification module for identifying and authenticating the user with the service, the method being characterized in that it comprises:

a prior broadcast step during which the second device broadcasts to the first device its ability to supply proof of an authentication;

and in that, when the first device seeks to authenticate itself, the method further comprises:

a request step (ET14, ET22) of the first device requesting the second device for proof of successful authentication with the service, the proof including the identity of the user of the second device;

a transmission step (ET16, ET23) of the second device transmitting the proof to the first device; and an authentication step (ET18, ET25) of authenticating the user of the first device on the basis of the received proof.

The invention thus proposes sharing proofs of successful authentications between devices in a common group of devices. It is explained below how a common group of devices may be the devices of a local network.

The prior step is a spontaneous proposal step performed by the second device and relating to at least one proof. This spontaneous proposal step avoids the first device interrogating the second device (or devices if there are several of them) in order to discover whether they can supply proof.

In this way, when one device possesses proof of successful authentication with the service, the invention avoids the need for new authentication if another device of the same group seeks to access the same service.

In an implementation, the method includes a prior identification step of identifying at least one device of the group that is suitable for supplying proof. By means of this optional characteristic, prior to requesting access to a service, it is known which device(s) can provide an identity service and can thus provide proof; the saving in time is thus not negligible, particularly when the number of devices that might provide proof is large.

In a hardware aspect, the invention provides a computer program including instructions for performing the above-defined method when the program is executed by a processor. Such a program can use any programming language. It may be downloaded from a communications network and/or stored on a computer-readable medium.

In a hardware aspect, the invention provides a device, referred to as a "second" device, having a communications module for communicating with a communications network and for accessing a service suitable for being delivered by a service provider and to which access needs to be preceded by authentication, the device being characterized in that it comprises:

a broadcast module suitable for broadcasting to other devices its ability to provide proof of an authentication; and a proof transmission module (MOD-TRS) suitable, on request, for transmitting proof of successful authentication relating to a service, the proof being sent to a first device in order to enable a user (UT) of the first device to be authenticated in order to access the service.

In another hardware aspect, the invention provides a device referred to as a "first" device, having a communications module for communicating with a communications network and for accessing a service suitable for being delivered by a service provider and to which access needs to be preceded by authentication, the device being characterized in that it comprises a processor module:

suitable for receiving from a second device a message indicating that the second device has the ability to supply proof of authentication;

suitable for requesting proof from the second device; and suitable for receiving from the second device proof of successful authentication relating to a service.

The module is also suitable for transmitting the proof it has received over the network in order to authenticate a user of the first device for accessing the service.

Finally, in a last hardware aspect, the invention provides a computer system comprising a first device as defined above and a second device as defined above.

Naturally, each of these devices includes software means such as instructions of the above-specified computer program, these instructions being executed by hardware means such as at least one proof and a working memory.

The invention can be better understood on reading the following description given by way of example and made with reference to the accompanying drawings, in which.

DETAILED DESCRIPTION OF AN EMBODIMENT ILLUSTRATING THE INVENTION

Figure 1:
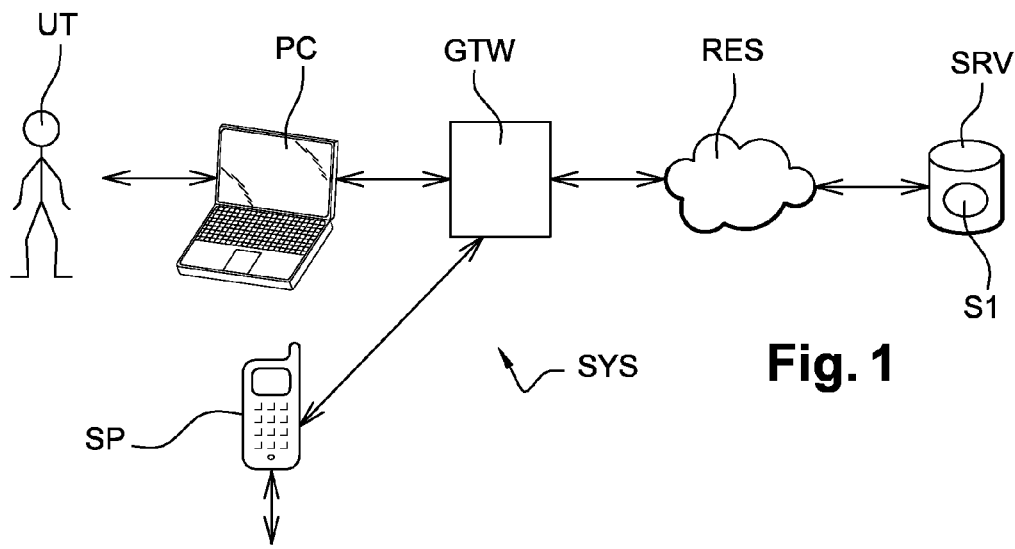
FIG. 1 shows a computer system used for illustrating an implementation of the invention.

FIG. 1 shows a system SYS comprising a local network including two devices represented by means of a computer PC and a smartphone SP. The computer may be a desktop or a laptop such as a tablet.

The devices are provided with physical and software resources. Specifically, and with reference to FIG. 2, the computer comprises:
- a processor CPU1 referred to as the "first" processor;
- a storage module MEM1, referred to as the "first" storage module; and
- a communications module COM1, referred to as the "first" communications module, for establishing a connection with the outside, and in particular with a gateway GTW.

A user UT uses the computer in order to access a service S1.

Figure 2:
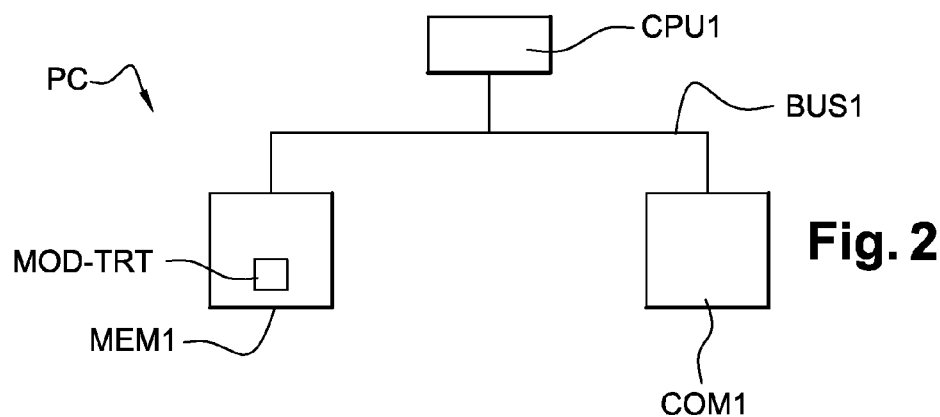
FIGS. 2 and 3 are diagrams showing the circuits included in the first and second devices respectively.

With reference to FIG. 2, the smartphone SP includes:
- a processor CPU2, referred to as the "second" processor;
- a storage module MEM2, referred to as the "second" storage module; and
- a communications module COM2, referred to as the "second" communications module of a first type, for establishing a connection with the outside, in particular with the gateway GTW.

The gateway GTW provides interconnection between a local network and an access network RES such as an asymmetric digital subscriber line (ADSL) network, a third generation (3G) network, etc.

In this example, the gateway GTW communicates with the computer and the smartphone via a WiFi network. The term "WiFi" (short for "wirelessly fidelity") covers wireless transmission technologies enabling wireless computer networks to be established in compliance with the standards of the IEEE 802.11 family. The invention is not limited to a WiFi network but extends to other types of network, e.g. a Bluetooth, NFC, Ethernet, etc. networks.

In this example, the gateway GTW has physical and software resources. A purely software gateway could also be used for performing the method. Such a software type gateway could be stored for example in the second memory MEM2 of the smartphone SP and executed by the second processor.

In the computer and in the smartphone the various modules are connected to the processor by means of a first bus BUS1 and of a second bus BUS2, respectively. It should be recalled that the function of a bus is to transfer digital data between various circuits of a computer. In this example, the bus in question includes a data bus and a control bus.

In this example it should also be observed that the above-described storage modules are permanent memories, e.g. of the read only memory (ROM) type and that the computer and the smartphone also include respective random access memories (RAM) (not shown) for storing on a short-term basis calculation data used in particular when performing the method.

The system also comprises a server connected to the ADSL network. This server stores the service S1 that is accessible from the computer or the smartphone via the gateway.

Below, two implementations are described; these implementations include steps (ETn,k); where n designates the implementation 1 or 2; and k is the reference to a particular step.

Both implementations take advantage of functions made available by the UPnP protocol, in particular an automatic discovery function described in the UPnP standard, which is incorporated by way of reference in the present application. The text of the standard is entitled "UPnP™ device architecture 1.1, document revision date Oct. 15, 2008" and is accessible at the following address:
http://upnp.org/specs/arch/UPnP-arch-DeviceArchitecture-v 1.1.pdf—Chapter 1 Discovery—1.1 SSDP (simple service discovery protocol), and Chapter 2 Description (devices+services).

Figure 4:
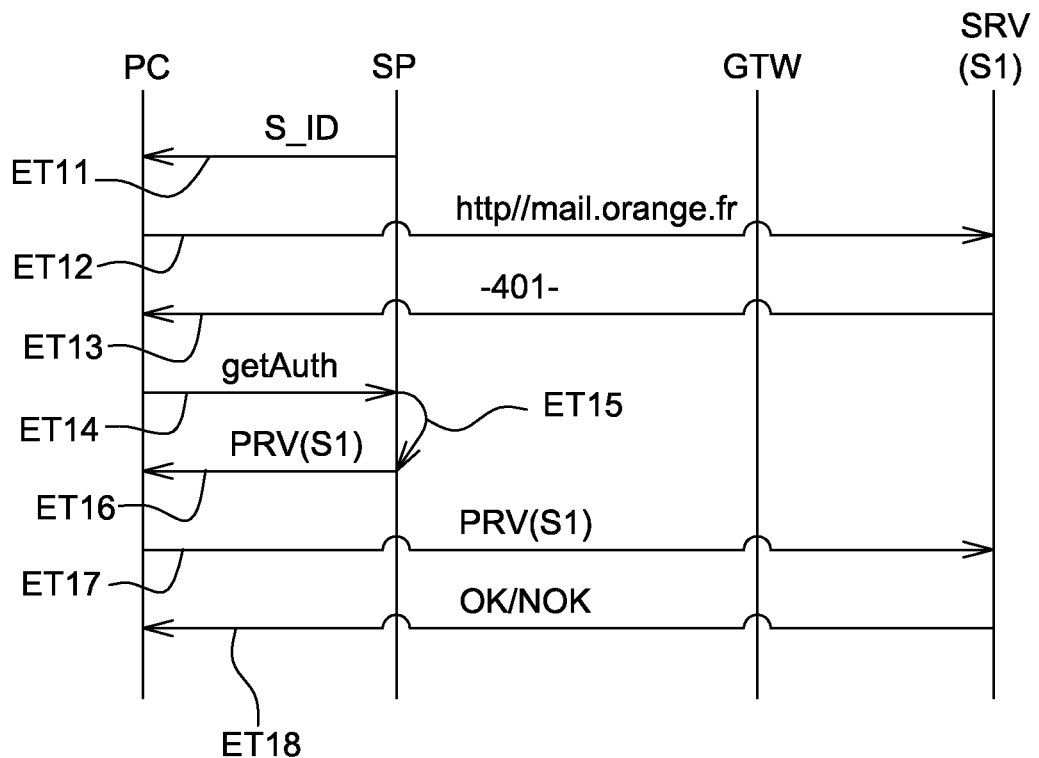
FIGS. 4 and 5 show exchanges of data between the computer, the smartphone, the gateway, and the server hosting a web or http type service, respectively in two implementations.

A first implementation is described with reference to FIG. 4.

In a first step ET11, using the UPnP protocol and the automatic discovery function described in the UPnP standard (which stands for universal plug and play), the smartphone SP exposes a service identity S-ID to the computer PC which identity is suitable for providing one or more successful authentication proofs.

During a second step ET12, a request to access a service S1 is sent by the computer PC to the server SRV. The access request may for example be a uniform resource locator (URL) of the type
http://mail.orange.fr/android-app that is input into a web browser.

During a third step ET13, the service S1 responds that authentication is required. By way of example, the response may be a response of the http type displaying the text "401 Authentication required", meaning that aces to the service requires authentication.

Figure 3:
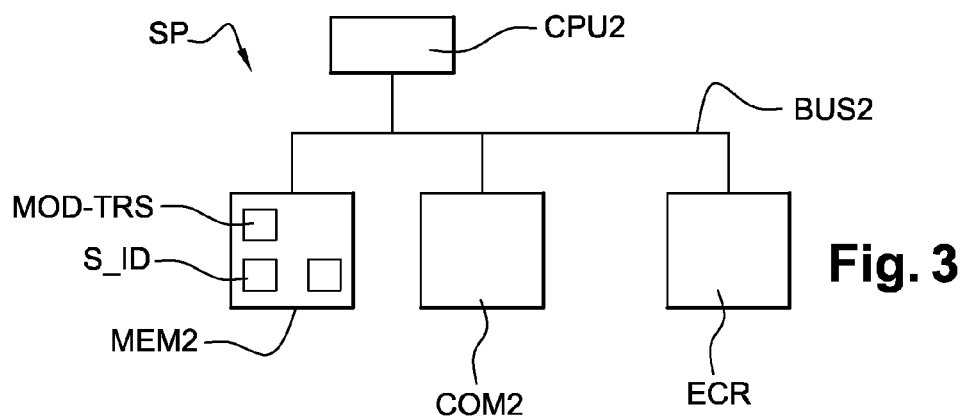

During a fourth step ET14, the computer PC having knowledge of the existence of the identity service S-ID on the smartphone requests the smartphone SP to provide proof of successful authentication. This "getAuth" request may be the "SOAP ACTION" request described in the UPnP standard at the following address:
http://upnp.org/specs/arch/UPnP-arch-DeviceArchitecture-v 1.1.pdf—Chapter 3 Control—cf. FIG. 3-1 (Soap Action).

During a fifth step ET15, a program CTRL optionally requests authentication from a user of the smartphone. For this purpose, in this example, a message is displayed on a screen ECR of the smartphone.

It is assumed in this example that the user of the smartphone (not shown) accepts to deliver proof of authentication.

During a sixth step ET16, the requested authentication proof PRV(S1), optionally as selected by the user, is provided by the smartphone SP. By way of example, the message in question is the SOAP RESP message as defined in the UPnP standard at the following address:
http://upnp.org/specs/arch/UPnP-arch-DeviceArchitecture-v 1.1.pdf—Chapter 3 Control—cf. FIG. 3-1 (Soap Resp).

During a seventh step ET17, the smartphone SP accesses the service S1 via the gateway GTW by providing the proof of authentication as received in the fifth step ET15.

During an eighth step ET18, the service S1 receives the proof of authentication PRV(S1) and verifies that the proof is valid. If so, the service S1 gives access to the service; if not, access to the service is not authorized.

It should be observed at this point that the order in which the steps are executed could vary. For example, the first step may be executed at any time before the fourth step ET14.

Figure 5:
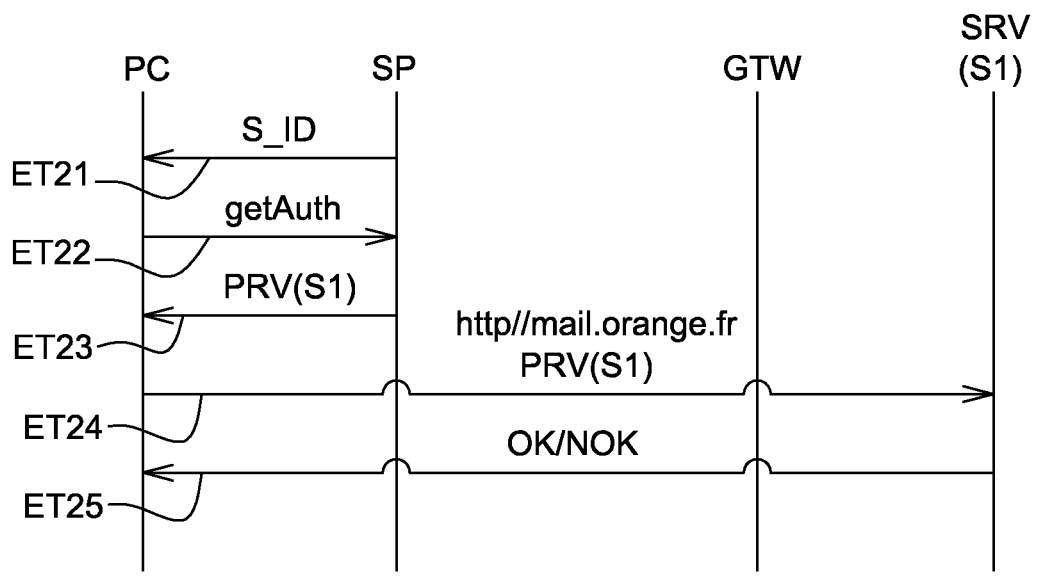

Thus, in a second implementation, the proof PRV(S1) may be transmitted from the smartphone SP to the computer PC prior to accessing the service. This second implementation is described with reference to FIG. 5. The steps are as follows.

The first step ET21 is the same as the first step ET11 described with reference to the first implementation.

During a second step ET22, equivalent to the fourth step ET14 described with reference to the first implementation, the computer having knowledge of the existence of the identity service S-ID on the smartphone requests proof of authentication from the smartphone. This "getAuth" request may be the "SOAP ACTION" request described in the UPnP standard at the following address:
http://upnp.org/specs/arch/UPnP-arch-DeviceArchitecture-v 1.1.pdf—Chapter 3 Control—cf. FIG. 3-1 (Soap Resp).

During a third step ET23, equivalent to the sixth step ET16 described with reference to the first implementation, the requested authentication proof PRV(S1), optionally as selected by the user, is supplied by the smartphone. By way of example, the message in question is the SOAP RESP message defined in the UPnP standard at the following address:
http://upnp.org/specs/arch/UPnP-arch-DeviceArchitecture-v 1.1.pdf—Chapter 3 Control—cf. FIG. 3-1 (Soap Resp).

During a fourth step ET24, equivalent to the second step ET12 described with reference to the first implementation, a request to access the service S1 is sent by the computer PC to the server SRV. By way of example, the access request may be a URL of the type http://mail.orange.fr/android-app input into a web browser. In this example, the computer accesses the service S1 via the gateway GTW by providing the proof of authentication received in the third step ET23.

The fifth step ET25 is the same as the eighth step ET18 described with reference to the first implementation.

Amongst other things, this second implementation avoids receiving an error message as mentioned in the third step ET13 described with reference to the first implementation.

These two implementations may be subjected to variations.

In a first variation, the smartphone may have an integrated circuit card of the subscriber identity module (SIM) type that is managed for example by a telecommunications operator. The proof of authentication may be stored in the SIM card. In this configuration, the proof is proof of authentication relating to the operator managing the SIM card. By way of example, this proof is proof of successful authentication with a network RES of the 3G type. The invention thus enables access from a computer that does not have a SIM card to a service that requires a SIM card.

During the first step ET11 or ET21 an automatic discovery function is performed. The invention is not limited to this example. The search for the presence of an identity service S-Id may be performed by transmitting a search request to target devices of the home network. In this configuration, and in this example, the computer interrogates the smartphone in order to discover whether it possesses an identity service suitable for providing one or more proofs. If the home network comprised other devices, for example a mobile telephone or an IP TV set, then the computer would have transmitted a request to those other devices, or to some of them.

Finally, it should be observed that proof may be valid for a plurality of services and not for only one service. It should also be observed that successful proof of authentication may relate to successful authentication with a telecommunications operator; the authentication in question may be authentication associated with a network of the 2G, 3G, 4G, etc. type. The resulting proof of successful authentication may then make access possible to a plurality of services made available by the operator, such as access to an email service, to a TV service, to a video-on-demand service, etc.

Thus, the smartphone may store a plurality of proofs of successful authentication relating to a plurality of different services and also relating to a plurality of identities. In this configuration:
  either the various proofs are transmitted from the smartphone to the computer. On reception, one of the proofs is selected on the computer;
  or proof selection is performed on the smartphone, with selection being followed by the proof being sent to the computer;
  or the computer sends a service identifier to the smartphone, the smartphone supplying in return the proof of authentication that is associated with that service;
  etc.

It should also be observed that, when http communication is involved, the proof may be a cookie. It should be recalled that the acronym http stands for hypertext transfer protocol and is well known to the person skilled in the art.

It should also be observed that a service provider corresponds to a server in which one or more services are stored.

The above-described method is performed by modules installed on the computer and the smartphone. In particular the terminal SP has a proof transmission module (MOD-TRS) suitable for transmitting proof of successful authentication relating to a service to the computer in order to authenticate a user of the computer for access to the service.

In the same way, the computer PC has a processor module (MOD-TRT) suitable for receiving proof of successful authentication relating to a service and for transmitting the proof it receives over the network for the purpose of authenticating a user of the computer to access the service.

The above-described invention may be performed by means of software and/or hardware modules. Consequently, the term "module" may correspond either to a software component, or to a hardware component, or indeed to a set of hardware and/or software components, suitable for performing the above-described function(s).

The invention claimed is:
1. A method comprising:
  authenticating a user of a first device while accessing a service offered by a service provider, the first device forming part of a group of devices in a local network that includes a second device of the user having an identification module for identifying and authenticating the user with the service, wherein authenticating a user comprises:

a prior broadcast step during which the second device broadcasts to the first device its ability to supply proof of an authentication;

and, when the first device seeks to authenticate itself, the method further comprises:

a request step of the first device requesting the second device for proof of successful authentication with the service, the proof including an identity of the user of the second device;

a transmission step of the second device transmitting the proof to the first device; and an authentication step of authenticating the user of the first device with the service on the basis of the received proof using the first device.

2. A method according to claim 1, wherein the method includes a prior identification step of identifying at least one device of the group that is suitable for supplying proof.

3. A non-transitory computer-readable medium comprising a computer program stored thereon, which includes instructions for performing a method, when the program is executed by a processor, the method comprising:

authenticating a user of a first device while accessing a service offered by a service provider, wherein the first device forms part of a group of devices in a local network that includes a second device of the user having an identification module for identifying and authenticating the user with the service, wherein authenticating a user comprises:

a prior broadcasting during which the second device broadcasts to the first device its ability to supply proof of an authentication;

and, when the first device seeks to authenticate itself, the method further comprises:

the second device receiving a request from the first device requesting the second device for proof of successful authentication with the service, the proof including an identity of the user of the second device;

a transmission step of the second device transmitting the proof to the first device; and an authentication step of authenticating the user of the first device with the service on the basis of the received proof using the first device.

4. A first device comprising:

a communications module configured to communicate with a communications network and access a service suitable for being delivered by a service provider and to which access needs to be preceded by authentication; and a processor module including a hardware processor configured to receive from a second device of the user in a local network that includes the first device, a message indicating that the second device has the ability to supply proof of authentication;

request proof from the second device;

receive from the second device proof of successful authentication relating to a service; and authenticate with the service using the proof.

5. A computer system comprising:

a local network comprising a first device of a user and a second device of the user;

the first device comprising:

a communications module configured to communicate with a communications network and access a service suitable for being delivered by a service provider and to which access needs to be preceded by authentication; and a processor module configured to:

receive from the second device a message indicating that the second device has the ability to supply proof of authentication;

request proof from the second device; and receive from the second device proof of successful authentication relating to a service; and the second device, which comprises:

a communications module configured to communicate with the communications network and to access the service suitable for being delivered by the service provider and to which access needs to be preceded by authentication;

a broadcast module configured to broadcast to other devices its ability to provide the proof of authentication; and a proof transmission module configured to, on request, transmit the proof of successful authentication relating to the service, the proof being sent to the first device in order to enable a user of the first device to be authenticated in order to access the service.

* * * * *

UNITED STATES PATENT AND TRADEMARK OFFICE
CERTIFICATE OF CORRECTION

PATENT NO. : 9,455,986 B2  
APPLICATION NO. : 14/411784  
DATED : September 27, 2016  
INVENTOR(S) : Marais et al.

Page 1 of 1

It is certified that error appears in the above-identified patent and that said Letters Patent is hereby corrected as shown below:

On the Title Page

Item [57] ABSTRACT:
Delete:
"The invention relates to a method of authenticating a user of a first device while accessing a service offered by a service provider, the first device forming part of a group of devices in a local network that includes a second device of a user having an identification module for identifying and authenticating the user with the service, the method being characterized in that it comprises a prior broadcast step during which the second device broadcasts to the first device its ability to supply proof of an authentication, and in that, when the first device seeks to authenticate itself, the method further comprising: a request step (ET14, ET22) requesting the second device for proof of successful authentication with the service, the proof including the identity of the user of the second device; a transmission step (ET16, ET23) of the second device transmitting the proof to the first device; and an authentication step (ET18, ET25) of authenticating the user of the first device on the basis of the received proof."
Insert:
--A method is provided for authenticating a user of a first device when accessing a service offered by a service provider. The first device belongs to a group of devices of a local network including a second device of a user having an identification module to identify and authenticate himself to the service. The method includes a preliminary delivery step during which the second device delivers a possibility of providing proof of authentication to the first device; and, when the first device wishes to authenticate itself, a step of requesting proof from the second device of successful authentication with regard to the service, said proof including the identity of the user of the second device, a step of transmitting the proof from the second device to the first device, and a step of authenticating the user of the first device on the basis of the proof received.--

Signed and Sealed this  
Twelfth Day of June, 2018

Andrei Iancu  
*Director of the United States Patent and Trademark Office*